United States Patent [19]
Nichols

[11] Patent Number: 5,501,829
[45] Date of Patent: Mar. 26, 1996

[54] METHOD OF MANUFACTURING A TRIM PANEL USING CORE BLOCK SPACER MEANS

[75] Inventor: Lawrence R. Nichols, Dover, N.H.

[73] Assignee: Davidson Textron Inc., Dover, N.H.

[21] Appl. No.: 289,526

[22] Filed: Aug. 12, 1994

[51] Int. Cl.$^6$ ............................. B29C 33/30; B28B 7/20
[52] U.S. Cl. ..................... 264/261; 264/263; 264/271.1; 264/275; 264/277; 264/318
[58] Field of Search .................... 264/275, 277, 264/278, 261, 263, 271.1, 318

[56] References Cited

U.S. PATENT DOCUMENTS

| 2,682,111 | 6/1954 | Kish | 264/275 |
| 3,021,241 | 2/1962 | Schneiderman et al. | 264/275 |
| 3,344,468 | 10/1967 | Moslo | 264/275 |
| 3,991,146 | 11/1976 | Barrie | 264/46.7 |
| 4,420,447 | 12/1983 | Nakashima | 264/46.4 |
| 4,900,489 | 2/1990 | Nagase et al. | 264/46.5 |
| 5,037,687 | 8/1991 | Kargarzadeh et al. | 428/71 |
| 5,073,318 | 12/1991 | Rohrlach et al. | 264/46.5 |
| 5,098,632 | 3/1992 | Conliffe | 264/339 |
| 5,104,596 | 4/1992 | Kargarzadeh et al. | 264/46.5 |
| 5,169,574 | 12/1992 | Leung et al. | 264/40.5 |
| 5,369,930 | 12/1994 | Kreizinger | 264/277 |
| 5,395,161 | 3/1995 | Spykerman et al. | 297/411.2 |

FOREIGN PATENT DOCUMENTS

| 2-57312 | 2/1990 | Japan | 264/275 |

Primary Examiner—Allan R. Kuhns
Attorney, Agent, or Firm—Reising, Ethington, Barnard & Perry

[57] ABSTRACT

A door trim panel component that has a nominal thickness includes an arm rest that has a die locked pocket for opening the door. The die locked pocket has a wall that is substantially thicker than the nominal thickness of the trim panel component to provide a comfortable hand grip. The door trim panel is molded with the aid of a preformed core block that is embedded in the hand grip to reduce the effective thickness of the hand grip during the molding process. The preformed core block is configured with a stand-off feature that facilitates molding and demolding the door trim panel.

8 Claims, 2 Drawing Sheets

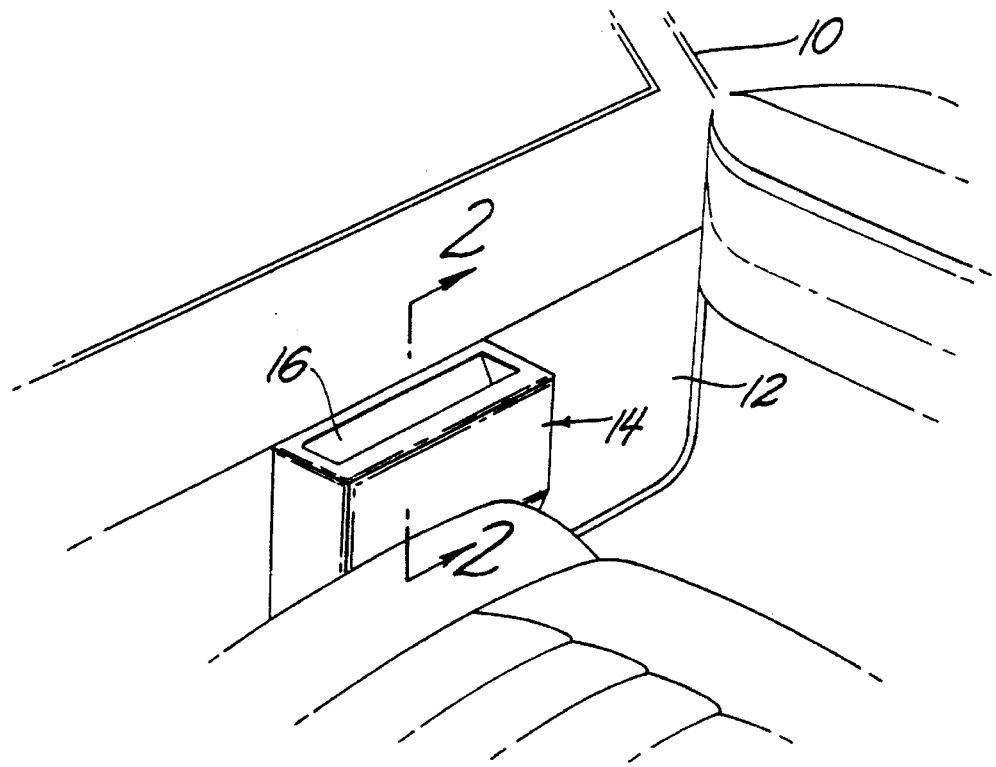
Fig. 1
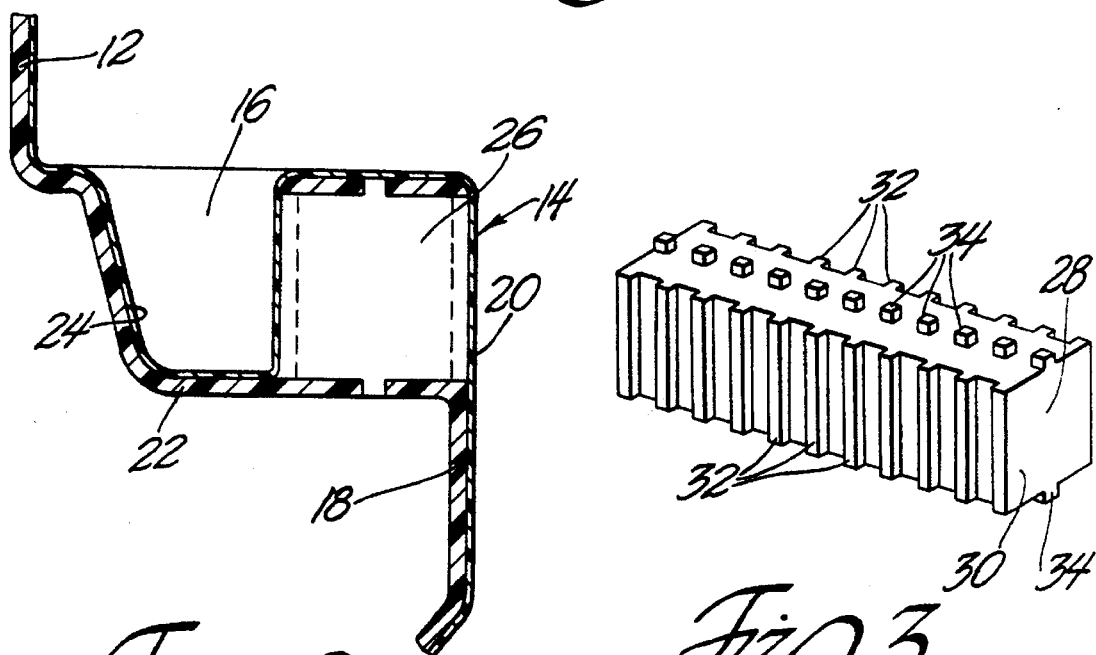
Fig. 2
Fig. 3

[5,501,829]

METHOD OF MANUFACTURING A TRIM PANEL USING CORE BLOCK SPACER MEANS

BACKGROUND OF THE INVENTION

This invention relates generally to the manufacture of trim panels and more particularly to the manufacture of trim panels that have a die locked pocket such as an automotive door trim panel that includes an arm rest that has a pull cup for pulling the door shut.

U.S. Pat. No. 5,104,596 granted to Reza Kargarzadeh et al Apr. 14, 1992 discloses a method of making a composite door panel having a die locked sail pocket. The door panel comprises a shell or skin, a substrate and an intermediate foam layer. The foam layer is foamed in place between a preformed skin and a preformed substrate in a mold. The mold has a lid that is equipped with a slide. When extended, the slide seals a sail pocket portion of the preformed substrate and centers it in a sail pocket portion of the preformed skin for the foaming operation. The slide is retracted to permit demolding of the foamed door panel. The patent does not specifically disclose how the skin and the substrate which also have die locked pockets are made.

This method is satisfactory for in place foaming of a composite trim panel that has a die locked pocket with walls that are substantially the same uniform thickness as the rest of the trim panel such as the composite door panel disclosed in the Kargarzadeh et al patent. However, the method is not entirely satisfactory for trim panels or trim panel components that have die locked pockets such as pull cups in an arm rest that require a wall that is substantially thicker than the trim panel or component to provide a comfortable hand grip for pulling the door shut. This is because the method among other reasons would at least require an increased cure time for curing the substantially thicker hand grip.

U.S. Pat. No. 5,073,318 granted to Milo L. Rohrlach et al Dec. 17, 1991 discloses a method of making a composite door panel that has a die locked map pocket at the bottom. The door panel comprises a substrate of rigid polyurethane foam reinforced with glass fibers that includes a die locked pocket portion for the map pocket. The substrate is molded in a first set of dies in which a pocket forming plug is installed as shown in stages A and B of FIG. 5 of the patent. The substrate is demolded with the plug retained in the die locked pocket portion and then finished in several stages. The plug is removed after the panel is completed as shown in stage E of FIG. 5 and as described in lines 36–47 in column 3 of the patent specification.

This method is also not satisfactory for making trim panels that have die-locked pockets that have a relatively thick wall such as door trim panels with arm rests that have pull cups which require a relatively thick hand grip for comfort and other ergonomical reasons. This method still requires an increased cure time for a thick hand grip portion. Moreover, the use of a discardable plug requires additional processing steps and increased manufacturing cost.

SUMMARY OF THE INVENTION

The object of this invention is to provide a quick and economical method for molding a trim panel component that includes a die locked pocket that has a relatively thick wall.

Another object of this invention is to provide a preformed core block for molding a trim panel component that includes a die locked pocket that has a relatively thick wall in a mold quickly and economically.

A feature of the invention is that the preformed core block reduces the effective thickness of the relatively thick wall of the trim panel component for the molding operation so that the cure time need not be increased for the relatively thick wall.

Another feature of the invention is that the preformed core block is embedded in the molded trim panel component eliminating any need for further processing of the preformed core block.

Still another feature of the invention is that the preformed core block is shaped with standoffs to facilitate both the molding and the demolding operation.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is a partial perspective view of an automotive interior that includes a door trim panel that has an arm rest which includes a pull cup for pulling the door closed that is made in accordance with the invention;

FIG. 2 is a section taken substantially along the line 2—2 of FIG. 1 looking in the direction of the arrows;

FIG. 3 is a perspective view of a core block that is used in making a component of the door trim panel of FIGS. 1 and 2;

DESCRIPTION OF THE INVENTION

Figure 4:
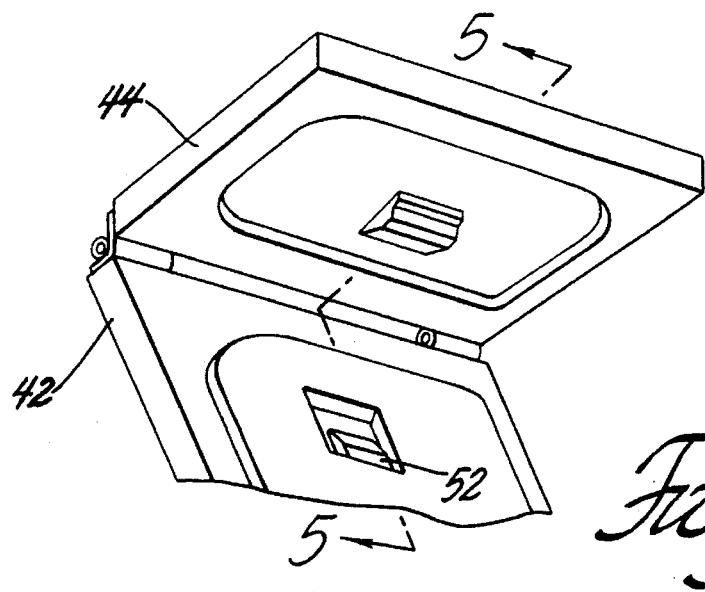
FIG. 4 is a perspective view of a mold for making the component of the door trim panel that uses the core block shown in FIG. 3.

Referring now to the drawing, FIG. 1 is a partial perspective view of an automotive interior showing a front door 10 on the driver's side of a passenger car that includes an interior trim panel 12 that is made in accordance with the invention.

The interior trim panel 12 includes an integral protrusion that is shaped to provide an arm rest 14 that has a pull cup 16 for pulling the front door closed.

The trim panel 12 comprises a molded component 18 of a relatively rigid plastic that provides the shaped structure of the trim panel 12 that is fastened to the door. Suitable materials for the component include polyurethanes, polyureas and such material may be filled with glass fibers or the like.

The component 18 may form a substrate for a decorative covering 20 as shown in FIG. 2 or the component itself may form the "first surface", that is the appearance surface.

This invention is concerned with molding the door trim panel component 18 which of course includes an integral protrusion 22 for the arm rest 14. The protrusion 22 in turn includes a rectangular die locked pocket 24 for the pull cup 16 that is large enough to accommodate the four fingers of a seat occupant's hand. Moreover, the die-locked pocket 24 is located in the protrusion 22 so that it has a thick wall at the interior side of the pocket 24 that is wide enough to provide a comfortable hand grip 26 when it is grasped between the four fingers and thumb of a seat occupant's hand to close the door.

The hand grip 26 is formed with the aid of a preformed core block 28 that is embedded in the molded door trim component 18 as a result of the molding process.

The preformed core block 28 is shown in FIG. 3. It comprises an elongated block shaped body 30 that has elongated sides, top and bottom and square or rectangular ends. The elongated sides each have a plurality of spaced ribs 32 that extend from the top to the bottom of the block shaped body 30. The elongated top and bottom each have a line of spaced short rectangular posts 34 midway between their elongated edges. The preformed core block 28 is sized so that the outer surfaces of the ribs 32 and the top surfaces of the posts 34 are part of the external surface of the hand grip 26 when the door trim component 18 is molded. Several advantages of this "stand off" feature of the preformed core block 28 are explained below.

Figure 5:
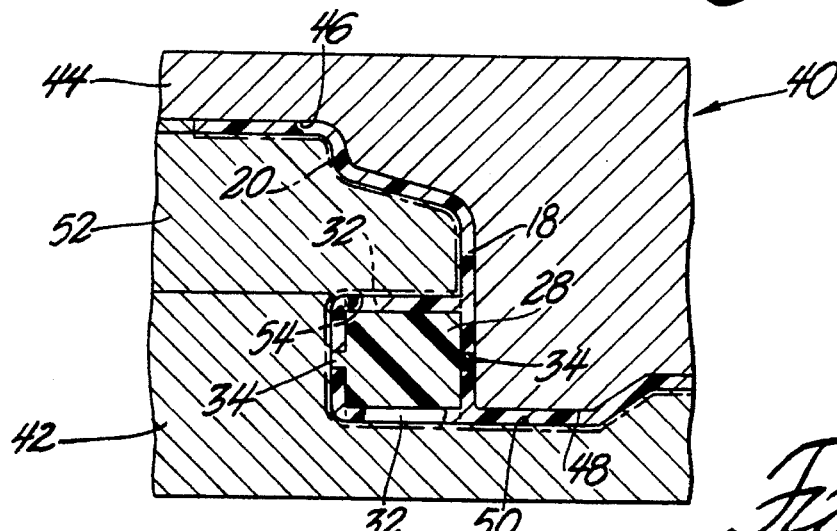
FIG. 5 is a fragmentary section showing the molded component of the door trim panel and the core block in the mold shown in FIG. 4.

Referring now to FIG. 4, the trim panel component 18 is molded in a mold apparatus 40 having a mold cavity 42 and a lid 44. The lid 44 has a forming surface 46 that includes a protrusion 48 for forming the protrusion 22 of the trim panel component 18 while the mold cavity 42 has a forming surface 50 that cooperates with the forming surface 46 for forming the protrusion 22. The mold cavity 42 also carries a retractable slide 52 that is extended for forming the die-locked pocket 24 in the protrusion 22 of the trim panel component 18. When extended, the slide 52 also forms an undercut cavity 54 in the mold cavity 42. This undercut cavity 54 holds the preform block 28 that aids in forming the hand grip 26 of the trim panel component 18 as shown in FIG. 5.

The trim panel component 18 is made in the following manner. The slide 52 is extended when the lid 44 is open and the preformed core block 28 is loaded into the undercut cavity 54 formed by the extended slide. The stand-off feature of the preformed core block 28, that is, the outer surfaces of the ribs 32 and the top surfaces of the posts 34 engage the surfaces of the undercut cavity 54 and the protrusion 48 to locate the preformed core block 28 properly when the preformed core block 28 is loaded and after the lid 44 is closed as shown in FIG. 5. This is one advantage of the stand-off feature.

The stand-off feature also provides communicating spaces in the closed mold for the molding portions of the hand grip 26 that embed the preformed core block 28. After the lid 44 is closed, the uncured plastic material is introduced into the closed mold filling the mold cavity to form the trim panel component 18 as shown in FIG. 5. As indicated above and as shown in FIG. 5, the uncured plastic material beneath the core block 28 flows between the ribs 32 to top of the core block 28 filling in the spaces between the ribs 32 the space above the core block 28 around the posts 34. When the plastic material cures, the core block 28 is entrapped cage-like by vertical bars of the molded trim panel 18 formed between the ribs 32 and an attached top interrupted by the posts 34. This process not only embeds the core block 28 but it also reduces the effective thickness of the hand grip 26 during the molding process to the thickness of the vertical bars and the attached top of the cage-like structure of the molded trim panel component 18 that is molded around the core block. This thickness is determined by the projection of the ribs 32 and the posts 34 which can be dimensioned so that the thickness is substantially the same as the nominal thickness of the panel component 18 as determined by the remaining portions of the panel component 18. Thus the trim panel component 18 that is molded in the closed mold in effect has a substantially uniform thickness even though it includes a thick comfortable hand grip 26. Because of this, the trim panel component 18 can be cured in a shorter time than is possible without the use of the preformed core block 28 and consequently the trim panel component 18 can be molded quickly and economically.

The molded trim panel component 18 is usually made of a reinforced plastic because it serves as a shaped structure that is attached to the vehicle structure such as the vehicle door. The molded trim panel component 18 can reinforced by use of a low density mat molding (LDMM) process in which a reinforcing mat is placed in the mold before it is closed and a thermoset resin is poured into the mold after closure to form a reinforced molded trim panel component 18. An alternative is a low density reinforced reaction injection molding (LDRRIM) process in which the reinforcement, generally in the form of short glass fibers, is introduced into the mold with the thermoset resin.

In any event, the hand grip 26 of the molded trim panel component 18 is die-locked as indicated above. Consequently the slide 52 must be retracted in order to demold the molded trim panel component 18 after it is sufficiently cured. The stand-off feature of the preform core block 28 provides another advantage in this regard, because the outer surfaces of the ribs 32 and the posts 34 provide non-stick surfaces for the slide 52 to retract on and for the lid 44 to slide on when it is opened and the molded trim panel component 18 is removed.

The preformed core block 28 can be made of any moldable material that can withstand the temperatures and pressures of the process for molding the trim panel component 18 including the same material that is used for the trim panel component 18. In some instances the core block 28 may need to be treated with an adhesion promoter if the core block 28 is made of a material that does not adhere well to the material used for the molding the trim panel component 18. Examples of materials for the preform core block 28 include expanded bead polystyrene, expanded bead polypropylene expanded bead SMA, structural (blown) thermoplastics.

As indicated above, the trim panel component 18 itself may provide the finished trim panel or it may provide a structural substrate that is covered to provide the finished trim panel.

For example, the molded trim panel component 18 can be provided with a sprayed urethane cover 20 such as shown in FIG. 2. The cover 20 could also be a urethane or polyvinyl chloride skin or an expanded version of the same that is adhesively bonded to the trim panel component 18. Another possibility is the use of a preformed skin in combination with an underlying soft foam layer that is foamed in place as shown in the U.S. Pat. No. 5,104,596 granted to Reza Kargarzadeh et al Apr. 14, 1992 which is discussed in the introduction.

Still yet another possibility in the use of a preformed skin of flexible material such as polyvinylchloride (PVC) that is placed in the mold cavity 42 of the mold apparatus 40 for the covering 20 as shown in phantom in FIG. 5. With this optional arrangement, the slide 52 is extended before the preformed skin 20 is placed in the mold cavity 42 and the undercut cavity 54 is lined with a portion of the preformed skin 20 that holds the preform block 28. The stand-off feature then engages the preformed skin 20 and the protrusion 40 to locate the preform block 28 properly after the lid 44 is closed. This option adheres the preformed skin 20 to the trim panel component 18 and includes the core block 28 in the trim panel component 18 when it is molded in the mold apparatus 40.

With this option, the invention has another advantage in that the preformed core block 28 maintains a substantially uniform thickness for the molded trim panel component 18 so that shrinkage in the preformed skin 20 is prevented even when high shrinkage materials are used for the preformed skin 20.

Figure 6:
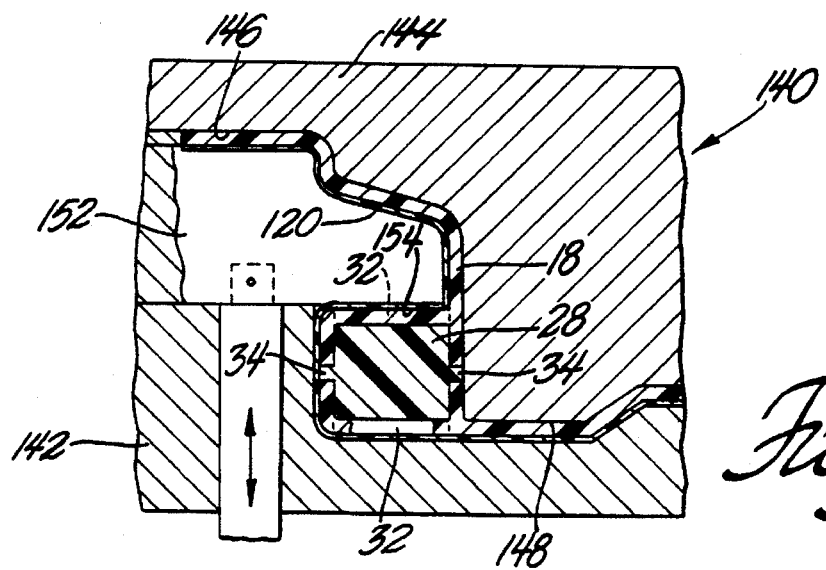
FIG. 6 is a fragmentary section showing the molded component of the door trim panel and the core block in an alternative mold.

FIG. 6 shows an optional mold apparatus 140 comprising a mold cavity 142 and a lid 144. The lid 144 still has a forming surface 146 that includes a protrusion 148 for forming the protrusion 22 of the trim panel component 18 and the mold cavity 142 still has a cooperating forming surface 150. However, in this instance, the mold cavity 142 carries a lifter 152 for forming the die-locked pocket 24 in the protrusion 22 of the trim panel component 18. When retracted, the lifter 152 forms an undercut cavity 154 in the mold cavity 142 for the preform block 28 as shown in FIG. 6.

The trim panel component 18 is made in the same manner in the optional mold apparatus 140 except that the lifter 152 is retracted for loading the core block 28 and molding the trim panel component 18. After the trim panel component is sufficiently cured, the lid 144 is opened and the lifter 152 is then raised to unblock the hand grip 26 so that the trim panel component 18 can be demolded.

The stand-off feature of the core block 28 provides the same advantages in the optional mold apparatus 140 of locating the core block 28, molding portions of the hand grip 26 and demolding the molded trim panel component 18.

While the core block 28 is illustrated as being square or rectangular, rounded or curved shapes are also possible so long as the core block 28 does not trap the slide 52 or lifter 152 in the pocket 24 of the protrusion 22.

The molded trim panel component 18 that is made in the optional mold apparatus 140 can be reinforced as before. Likewise, it may provide the finished trim panel or it may provide a structural substrate that is covered as before.

FIG. 6 illustrates a preformed skin 20 of flexible material such as polyvinylchloride (PVC) for the covering. The preformed skin 20 is loaded into the mold cavity 142 when the lifter 152 is retracted and before the core block 28 is inserted into the undercut 154.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of molding a trim panel component that has a nominal thickness and that includes a die locked pocket that has a wall that is substantially thicker than the nominal thickness of the trim panel component, comprising the steps of:

providing a preformed core block comprising a body that has a plurality of stand offs, providing a mold apparatus having a retractable slide or lifter that forms an undercut cavity for forming a die locked pocket in the molded trim panel component, loading the preformed core block into the undercut cavity so that the body is spaced from surfaces of the undercut cavity by the stand offs, and introducing uncured plastic material into the mold apparatus to mold the trim panel component so that the preformed core block is embedded in a relatively thick wall of the molded trim panel component.

2. The method of molding the trim panel component as defined in claim 1 wherein the preformed core block is sized and shaped to reduce the effective thickness of the relatively thick wall during the molding process to the nominal thickness of the trim panel component.

3. The method of molding the trim panel component as defined in claim 1 wherein the slide or lifter is moved to demold the molded trim panel component and the preformed core block is sized and shaped to provide non-stick surfaces for movement of the slide or lifter.

4. A method of molding a door trim panel component that has a nominal thickness and that includes a die locked pocket that has a wall that is substantially thicker than the nominal thickness of the trim panel component for providing a comfortable hand grip, comprising the steps of:

providing a preformed core block comprising an elongated block shaped body that has elongated sides, top and bottom each having a plurality of stand-offs, providing a mold apparatus having a mold cavity and a lid, one of which has a retractable slide or lifter that forms an undercut cavity for forming a die locked pocket, loading the preformed core block into the undercut cavity so that the body is spaced from surfaces of the mold cavity and lid by the stand offs when the mold is closed, closing the mold and introducing uncured plastic material into the closed mold to mold the trim panel component so that the core block is entrapped cage-like by portions of the molded trim panel compartment.

5. The method of molding the trim panel component as defined in claim 4 wherein the stand offs include spaced ribs on the elongated sides of the body and spaced posts located midway between elongated edges of the top and bottom respectively.

6. The method of molding the trim panel component as defined in claim 4 wherein the preformed core block is sized and shaped to reduce the effective thickness of a molded portion of the wall for the hand grip to the nominal thickness of the trim panel component during the molding process.

7. The method of molding the trim panel component as defined in claim 4 wherein the slide or lifter is moved to demold the molded trim panel component and the core block is sized and shaped to provide non-stick surfaces for the slide or lifter to move on and for the lid to move on when it is opened and the molded trim panel component is removed.

8. The method of molding the trim panel component as defined in claim 4 wherein a preformed skin is placed in the mold apparatus so that a portion of the preformed skin lines the undercut cavity that receives the preformed core block.

\* \* \* \* \*